United States Patent [19]
Whited

[11] Patent Number: 5,894,574
[45] Date of Patent: Apr. 13, 1999

[54] APPARATUS AND METHOD FOR SIB-BASED GLOBAL TITLE TRANSLATION SERVICES

[75] Inventor: John L. Whited, Richardson, Tex.

[73] Assignee: Alcatel USA Sourcing, L.P., Plano, Tex.

[21] Appl. No.: 08/772,568

[22] Filed: Dec. 26, 1996

Related U.S. Application Data

[60] Provisional application No. 60/016,570, May 3, 1996.

[51] Int. Cl.$^6$ .................................................. G06F 5/00

[52] U.S. Cl. ..................................................... 395/701

[58] Field of Search ................................. 395/685, 701, 395/500; 370/271, 401; 455/515; 707/103

[56] References Cited

U.S. PATENT DOCUMENTS

| | | | |
|---|---|---|---|
| 5,297,285 | 3/1994 | Abrahamsson et al. | 395/685 |
| 5,577,041 | 11/1996 | Sharma et al. | 370/271 |
| 5,706,286 | 1/1998 | Reiman et al. | 370/401 |

*Primary Examiner*—James P. Trammell
*Assistant Examiner*—Matthew Smithers
*Attorney, Agent, or Firm*—Baker & Botts, L.L.P.

[57] ABSTRACT

Global title translation services or programs are generated by using service independent building blocks (200). A graphical editor or interface (300) may be used to select and link icon representations (302) of service independent building blocks previously defined to perform discrete functions associated with global title translation. The linked service independent building blocks form a logic program (220) which is then interpreted to generate a C++ equivalent executable program (241).

48 Claims, 5 Drawing Sheets

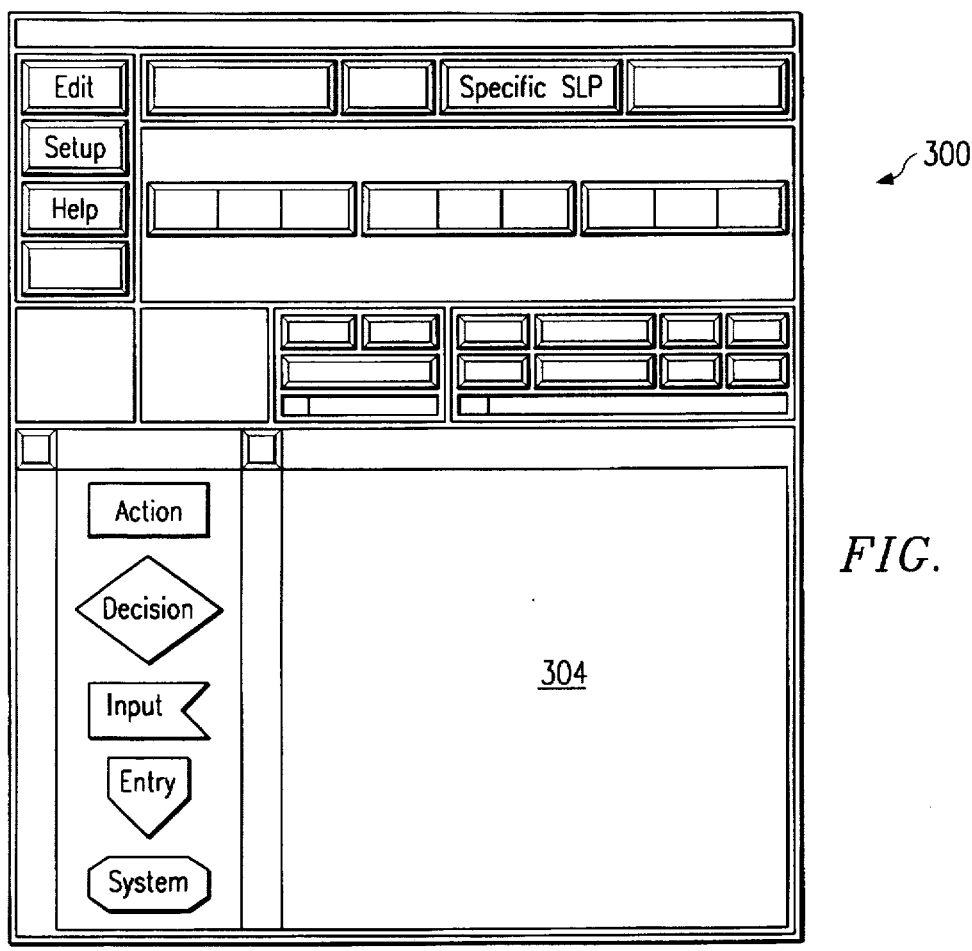
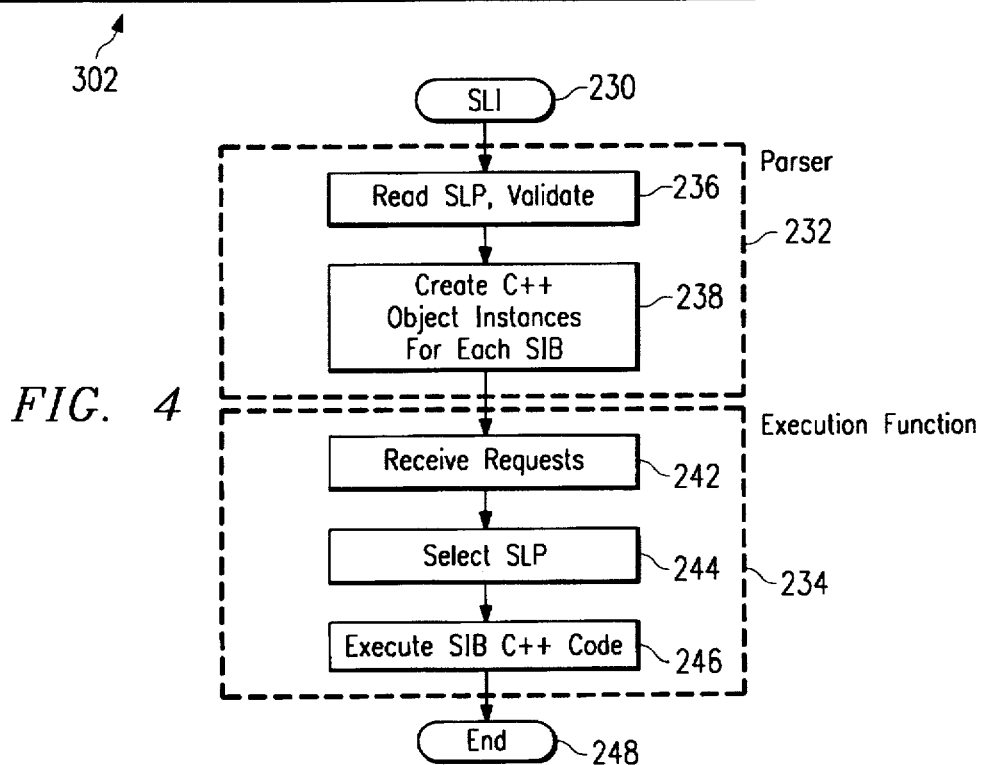
FIG. 3
FIG. 4

APPARATUS AND METHOD FOR SIB-BASED GLOBAL TITLE TRANSLATION SERVICES

RELATED APPLICATIONS

This application claims the benefit of U.S. Provisional Application No. 60/016,570, entitled Apparatus and Method for SIB-Based Global Title Translation Services, filed on May 3, 1996.

TECHNICAL FIELD OF THE INVENTION

This invention is related in general to the field of telecommunications systems. More particularly, the invention is related to apparatus and method for SIB-based (service independent building block-based) global title translation (GTT) services.

BACKGROUND OF THE INVENTION

The public telecommunications network makes extensive use of signaling system number 7 (SS7) protocol to communicate among the various network elements. End-to-end routing of a signaling system number 7 message often requires the execution of a process called global title translation (GTT). New telecommunications services such as local number portability (LNP) have created an increased demand for flexibility in global title translation; therefore, rapid creation of new global title translation algorithms is needed.

In order to create the software code to implement the new global title translation processes, many programming hours are needed if traditional computer programming methods are used. It is not uncommon to have a turn around of one to two years when new services must be coded directly in assembly and/or C programming languages. In today's fast paced telecommunications environment, this tedious and time consuming service implementation method is unacceptable.

SUMMARY OF THE INVENTION

Accordingly, a need has arisen for the implementation of global title translation services in a quick and easy manner without the delay and effort associated with traditional software development processes. Thus, the teachings of the present invention provide a system and method for coding and performing global title translation with the use of service independent building blocks.

In an aspect of the invention, a system for coding global title translation services includes a plurality of predefined service independent building blocks each performing a discrete function associated with global title translation. A graphical editor may be used to facilitate a user to select and link the plurality of service independent building blocks to form a logic program performing a global title translation service. The system also includes an object library having a plurality of predefined object classes each corresponding to a service independent building block. A logic interpreter is used to create instances of objects from the predefined object classes in the object library to correspond with the plurality of service independent building blocks in the logic program to produce an executable logic program.

In another aspect of the invention, a method for coding global title translation services includes the steps of defining a plurality of predefined service independent building blocks each performing a discrete function associated with global title translation, and selecting and linking service independent building blocks to form a logic program performing a global title translation service. An executable logic program may then be created by selecting from an object library object classes corresponding to service independent building blocks in the logic program, and instantiating objects of the selected object classes.

BRIEF DESCRIPTION OF THE DRAWINGS

For a better understanding of the present invention, reference may be made to the accompanying drawings, in which:

FIG. 3 is an exemplary screen layout for a graphical editor of a service creation environment for creating global title translation services using service independent building block icons according to the teachings of the present invention;

FIG. 4 is a flowchart of an exemplary global title translation logic interpreter according to the teachings of the present invention;

DETAILED DESCRIPTION OF THE INVENTION

Figure 1:
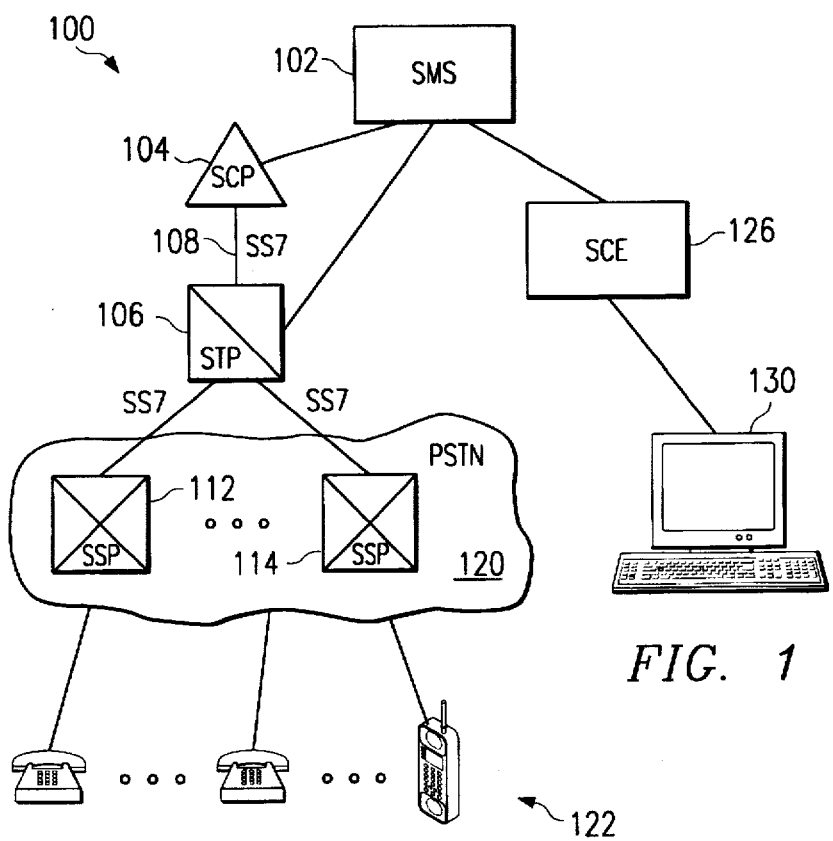
FIG. 1 is a simplified block diagram of an exemplary telecommunications network.

The preferred embodiment(s) of the present invention is (are) illustrated in FIGS. 1–7, like reference numerals being used to refer to like and corresponding parts of the various drawings.

FIG. 1 shows an exemplary telecommunications network 100 such as an advanced intelligent network (AIN). Network 100 includes a service management system (SMS) 102 which interfaces with a service control point (SCP) 104 and a signal transfer point (STP) 106 via an industry standard protocol such as X.25. Service management system 102 provides network information, database management, and administrative support for network 100. Service management system 102 generally interfaces with service control point 104 for provisioning, database management, service control point application program management, and collecting traffic metering and measurement data. Service control point 104 is also directly linked to signal transfer point 106 via a signaling system number 7 (SS7) linkset 108. Signal transfer point 106 is further coupled to one or more service switching points (SSPs) 112 and 114, which perform the switching and call handling functions in the network. Service control point 104 is a transaction based processing system whose primary responsibility is to respond to queries from service switching points 112 and 114 for data needed to complete routing a call. Service switching points 112 and 114 are part of the public switched telephone network (PSTN) 120 and are coupled to the telephone service subscribers or customers 122.

Service independent building blocks (SIBs) are the building blocks previously used to construct service logic programs to implement network services. These service independent building blocks, as defined in the International Telecommunication Union CCITT ITU-T Q.1213, are primarily used in a service creation environment (SCE) 126 through a user interface 130 to produce the service logic programs that are then downloaded to network elements such as service management system 102, service control point 104, and/or signal transfer point 106, where they are executed. The teachings of the present invention applies the use of service independent building blocks to global title translation (GTT), so that algorithms for handling global title translation queries or requests may be easily implemented and modified without explicit coding in a computer programming language.

Figure 2:
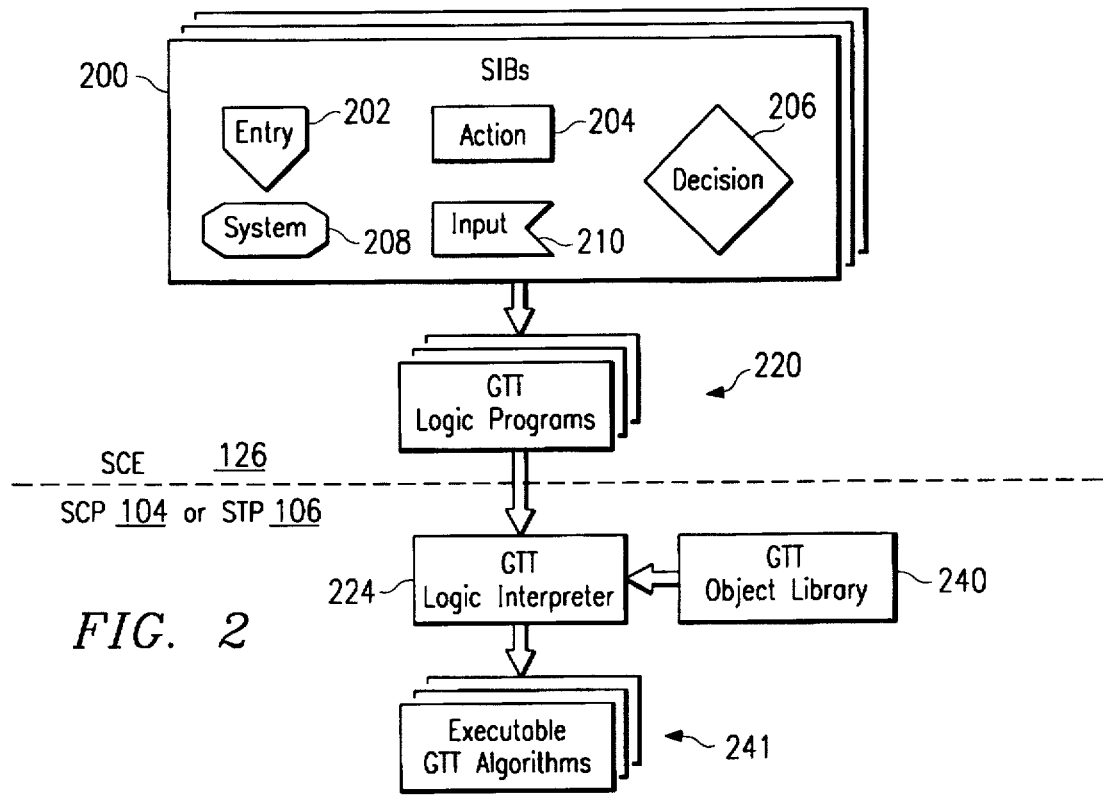
FIG. 2 is a simplified block diagram illustrating the use of service independent building blocks (SIBs)

Referring also to FIG. 2, the present invention provides several different classes or types of service independent building blocks 200, including entry 202, action 204, decision 206, system 208, and input 210. These different classes of service independent building blocks can be linked to form a global title translation logic program 220. In a preferred embodiment, a graphical editor and user interface 300, an example of which as shown in FIG. 3, may be used to facilitate the creation of global title translation logic programs. The global title translation logic programs may be generated using a service creation environment 126 or any other suitable network element. Icons 302 of service independent building block classes are provided, which may then be picked up and dropped into place in a work area 304 and linked together. ASCII global title translation logic programs 220 are created from the linked service independent building blocks, which is then provided to other network elements through service management systems 102 (FIG. 1), such as service control point 104 (FIG. 1) and signal transfer point 106 (FIG. 1), where global title translation may take place. In the network elements, the ASCII logic programs 220 are provided as input to a logic interpreter 224.

Referring also to FIG. 4, a simplified flowchart of an embodiment of the logic interpretation process 230 is shown. Logic interpreter 224 or method 230 therefor may include two components: a parser 232 and an execution function 234. Parser 232 first reads logic programs 220 and validates them, as shown in step 236. Thereafter, parser 232 creates an instance of a C++ object for each service independent building block by accessing previously generated C++ object classes or templates stored in a C++ object library 240, as shown in step 238. These instances are linked to form executable global title translation algorithms 241.

During run time, execution function 234 receives queries or requests for global title translation, and selects the appropriate C++ logic programs to perform the translation as shown in steps 242 and 244. The selected logic programs in C++ are then executed to handle global title translation, as in step 246. The process flow terminates in step 248. In this manner, the same C++ code for the same service independent building blocks may be reused in many global title translation logic programs without duplicating the effort to recode the logic.

Figure 5:
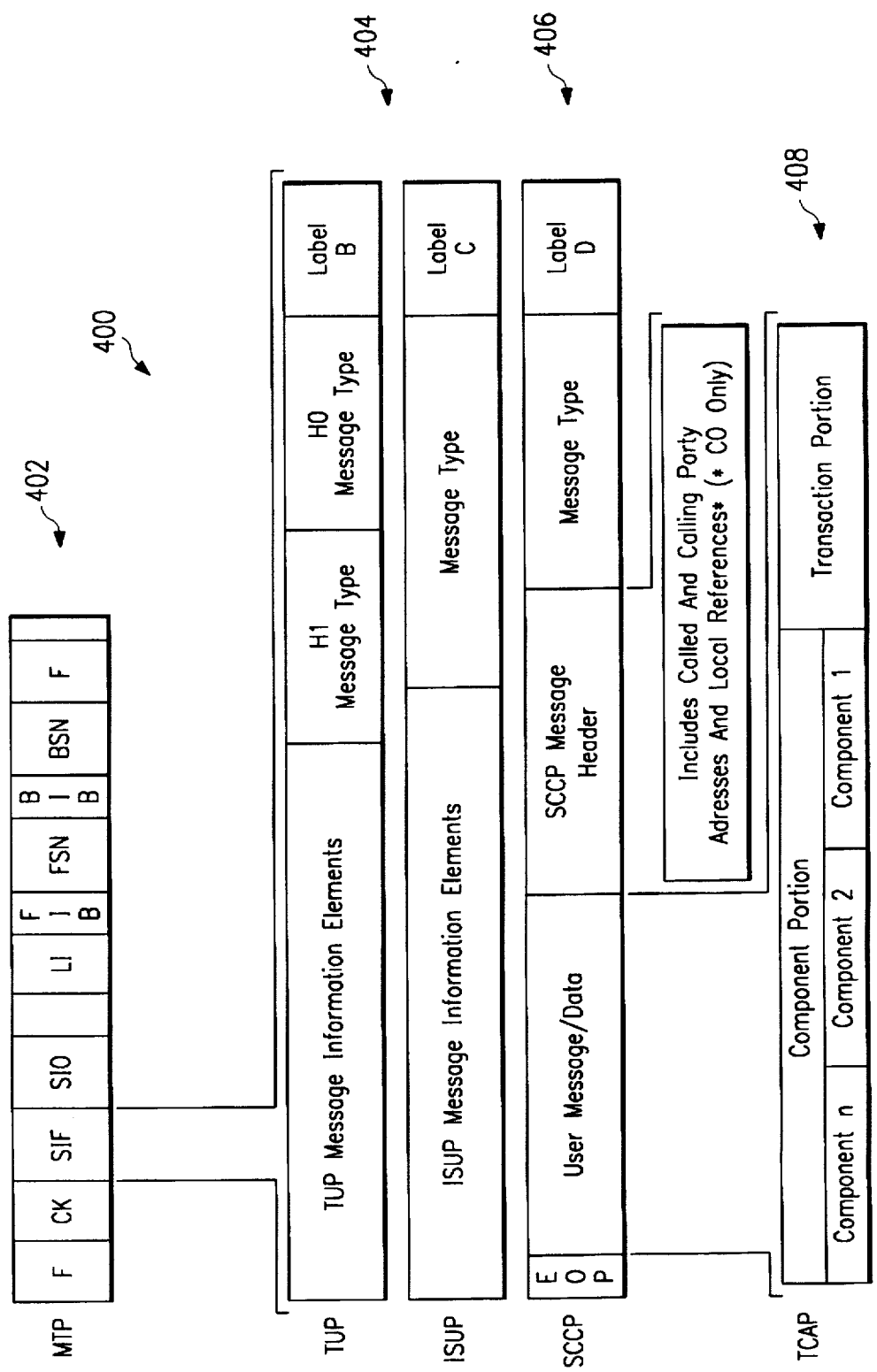
FIG. 5 is a block diagram of signaling system number 7 (SS7) message structure.

FIG. 5 shows the signaling system number 7 message structure 400 having the message transfer part (MTP) 402, user parts 404, signaling connection control part (SCCP) 406, and transaction capabilities application part (TCAP) 408. The message transfer part 402 contains the necessary mechanism to ensure reliable transmission of functional signaling messages. The signaling connection control part 406 provides the means to control logical signaling connections in the network and transfer signaling data units across the network. It provides a routing and translation function that allows signaling messages to be routed to a signaling point. Transaction capabilities application part 408 provides the means to exchange operations and replies via a dialogue. It provides the means to establish noncircuit-related communication between two nodes in the signaling network.

With the advent of new services, global title translation for some switch-to-switch or switch-to-line information database (LIDB) services require all ten digits (three digits of number plan area (NPA) or area code, three digits of exchange code (EC), and four digits of station number (STN)) of a telephone number to perform end-to-end routing. Previously, it was sufficient to perform the global title translation at the signaling connection control part level 406 because only six digits of the telephone number was required. To access all ten digits, information in the transaction capabilities application part portion of the signaling system number 7 message may be needed.

The teachings of the present invention use service independent building block technology in a new way through the use of the newly created service independent building blocks (shown in FIGS. 6 and 7), including:

Queue Call, Notify Free, Prov Value, Msg Available, and Msg Retrieved (502)—These service independent building blocks decode the necessary information from incoming transaction capability application part messages to extract 10-digit called party information. This information may be needed in the subsequent global title translation service logic.

GetSccpInfo (504)—While standard TCAP-based applications do not need access to signaling connection control part information, global title translation applications do. This service independent building block retrieves the global title address field within the called party address portion of the signaling connection control part message structure. Other fields may also be retrieved per service logic requirements.

SetSccpInfo (508 and 608)—The global title translation algorithm alters the setting of sub-fields within the called party address portion of the signaling connection control part message. This service independent building block is used to store the updated information in the signaling connection control part message.

Echo Query (510 and 610)—The global title translation algorithm should not perturb the contents of the transaction capabilities application part portion of the message. This service independent building block uses updated signaling connection control part information per above and builds a unitdata message to be routed by the signaling connection control part subsystem.

UDTService (512 and 514; 612 and 614)—Should the global title translation algorithm fail, and if the received unitdata message indicated "return on error", then this service independent building block will build a unitdata service message and return it to the originator of the signaling connection control part message.

Figure 6:
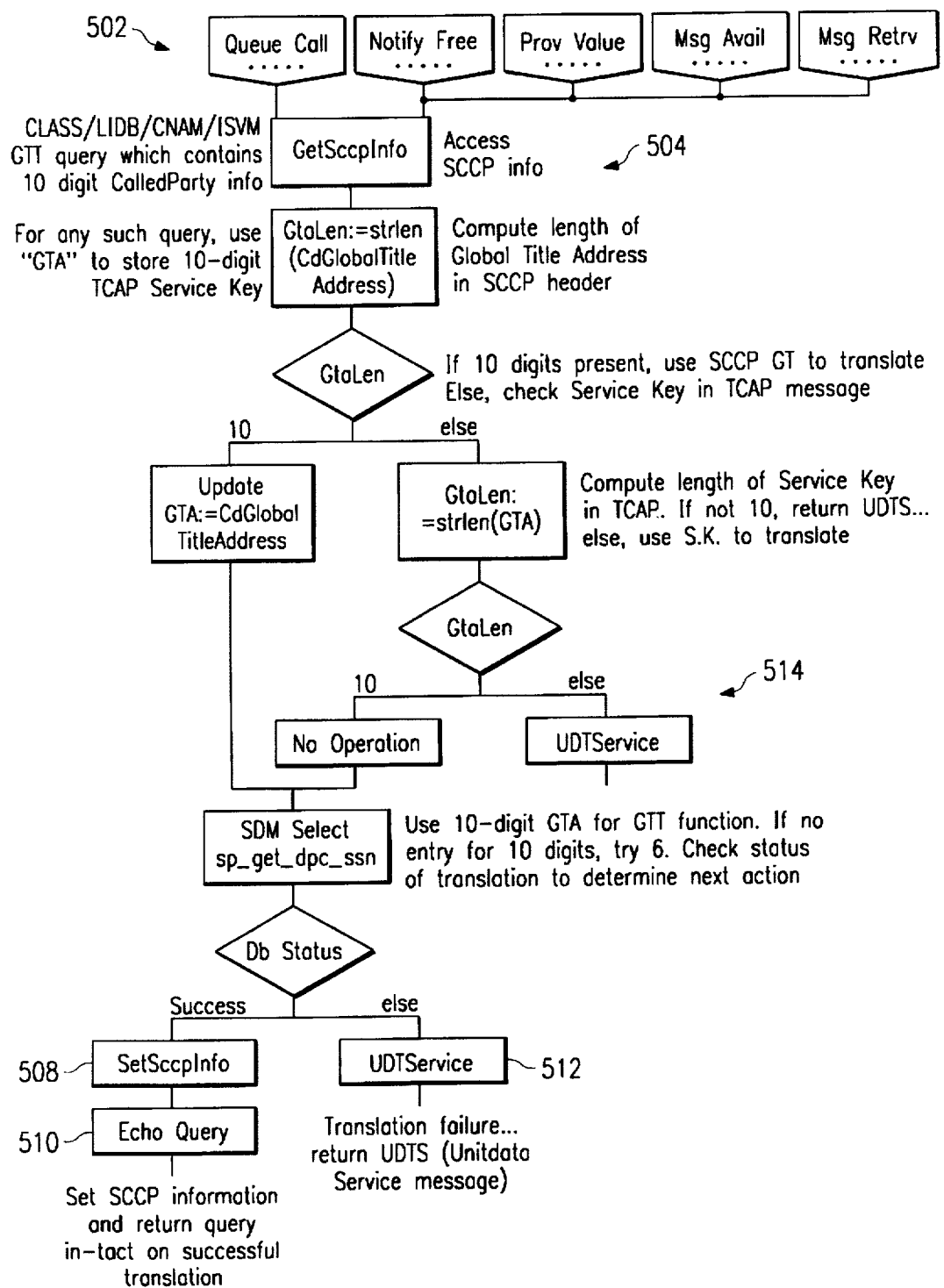
FIG. 6 is an exemplary logic program receiving a transaction capability application part (TCAP) query message and responding with a transaction capability application part message following global title translation according to the teachings of the present invention.

Accordingly, a global title translation program or service may be created by linking appropriate service independent building blocks, such as one shown in FIG. 6. Global title translation program 500 includes entry service independent building blocks 502 which receive unit data messages having transaction capabilities application part and signaling connection control part. To perform global title translation, the signaling connection control part of the message is accessed, as shown in service independent building block 504. Some service logic then takes place to translate 10-digit global site address information into the destination routing information. The service logic may access the transaction capabilities application part of the unit data message to obtain all ten digits of the telephone number. The signaling connection control part is then updated with new information, as shown in block 508. The unitdata message containing the transaction capabilities application part is then returned intact, as shown in block 510. If the global title translation fails, a unitdata service message is returned to the originator of the message to indicate translation failure, as shown in block 512.

Figure 7:
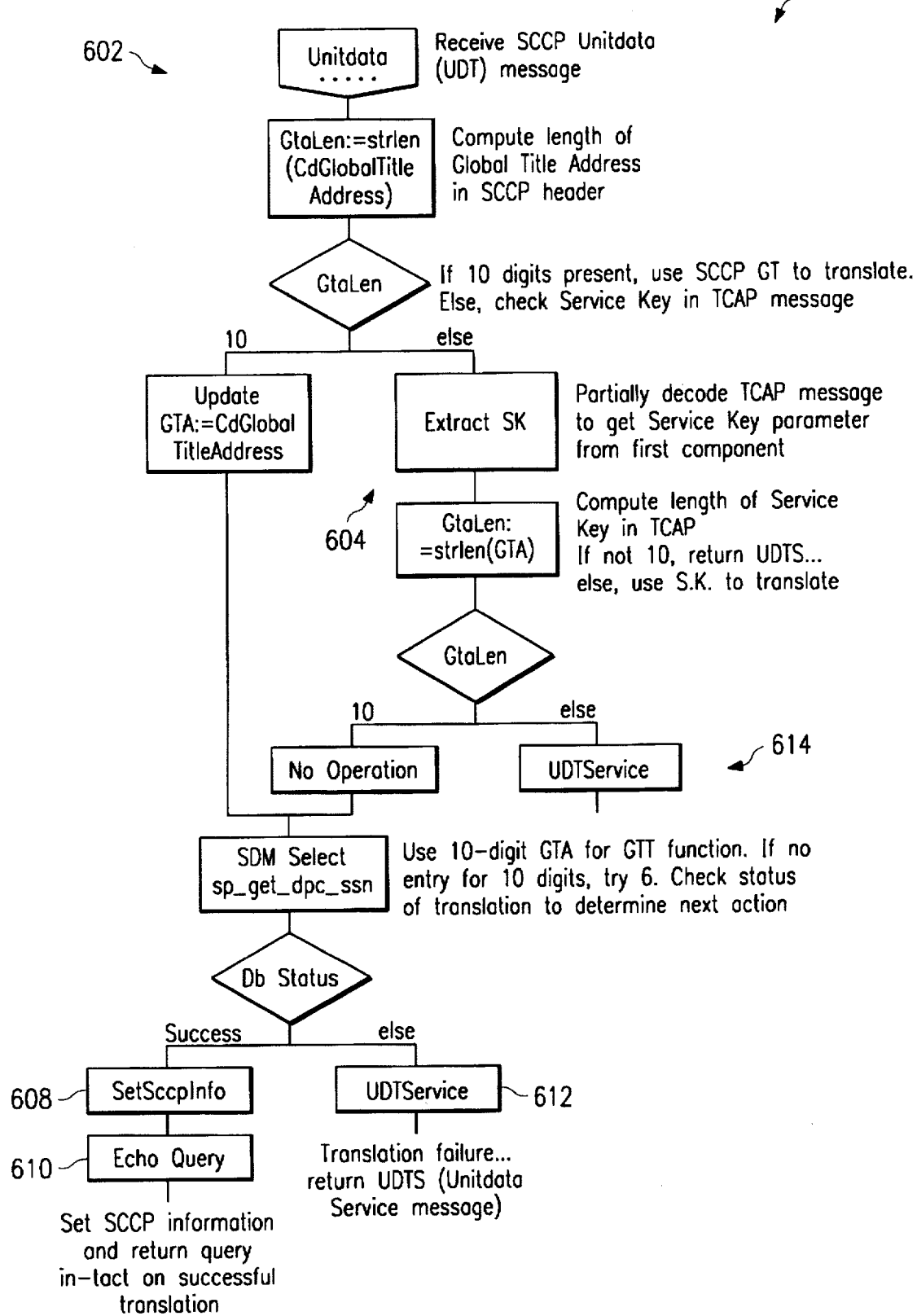
FIG. 7 is an exemplary logic program receiving a signaling connection control part (SCCP) unitdata message and responding with another signaling connection control part unitdata message following global title translation according to the teachings of the present invention.

Another exemplary global title translation logic program 600 is shown in FIG. 7. Logic program 600 is an alternative implementation that is more directly an SCCP application rather than a modified TCAP application. This requires two additional newly created service independent building blocks as follows:

Unitdata (602)—Following receipt of a signaling connection control part unitdata message, this service independent building block retrieves the global title address field within the called party address portion of the signaling connection control part message structure. Other fields may also be retrieved per service logic requirements.

Extract SK (604)—This specialized service independent building block decodes the necessary information from incoming transaction capabilities application part messages to extract 10-digit called party information, normally found in the service key (SK) parameter. This information may be needed in the subsequent global title translation service logic.

Constructed and operating in this manner, global title translation programs can be created by using service independent building blocks instead of hand coding in C or C++. After generating the service independent building blocks and its associated C++ code once, the user or programmer can create and modify new global title translation programs without writing any new source code, making rapid development and implementation of new global title translation programs possible.

Although the present invention and its advantages have been described in detail, it should be understood that various changes, substitutions and alterations can be made therein without departing from the spirit and scope of the invention as defined by the appended claims.

What is claimed is:

1. A system for performing global title translation using service independent building blocks, comprising:

a graphical editor adapted for facilitating a user to select and link a plurality of service independent building blocks to form a logic program performing a global title translation service, the plurality of service independent building blocks operable to access a received signaling system no. 7 message of a global title translation request;

an object library having a plurality of predefined object classes each corresponding to a service independent building block; and a logic interpreter adapted for receiving the logic program and creating instances of objects from the predefined object classes in the object library to correspond with the plurality of service independent building blocks in the logic program to produce an executable logic program.

2. The system, as set forth in claim 1, wherein the logic interpreter comprises a parser for parsing the logic program.

3. The system, as set forth in claim 1, wherein the logic interpreter comprises an execution function adapted for receiving a request for global title translation, and selecting an appropriate executable logic program for executing on the request.

4. The system, as set forth in claim 3, wherein the service independent building blocks comprise a service independent building block for accessing a signaling connection control part of the global title translation request.

5. The system, as set forth in claim 3, wherein the service independent building blocks comprise a service independent building block for updating a signaling connection control part of the global title translation request.

6. The system, as set forth in claim 3, wherein the service independent building blocks comprise a service independent building block for accessing a transaction capabilities application part of the global title translation request.

7. The system, as set forth in claim 3, wherein the service independent building blocks comprise a service independent building block for receiving the global title translation request.

8. The system, as set forth in claim 3, wherein the service independent building blocks comprise a service independent building block for returning a response to the global title translation request.

9. The system, as set forth in claim 3, wherein the service independent building blocks comprise a service independent building block for receiving a signaling connection control part unitdata message.

10. The system, as set forth in claim 3, wherein the service independent building blocks comprise a service independent building block for extracting a service key from a transaction capabilities application part message.

11. The system, as set forth in claim 1, wherein the graphical editor comprises user-manipulatable icon representations of the service independent building blocks.

12. A system for coding global title translation services, comprising:

a plurality of predefined service independent building blocks each performing a discrete function associated with global title translation;

a graphical editor adapted for facilitating a user to select and link the plurality of service independent building blocks to form a logic program performing a global title translation service, the service independent building blocks operable to access a received signaling system no. 7 message of a global title translation request;

an object library having a plurality of predefined object classes each corresponding to a service independent building block; and a logic interpreter adapted for receiving the logic program and creating instances of objects from the predefined object classes in the object library to correspond with the plurality of service independent building blocks in the logic program to produce an executable logic program.

13. The system, as set forth in claim 12, wherein the logic interpreter comprises a parser for parsing the logic program.

14. The system, as set forth in claim 12, wherein the logic interpreter comprises an execution function adapted for receiving a request for global title translation, and selecting an appropriate executable logic program for executing on the request.

15. The system, as set forth in claim 14, wherein the service independent building blocks comprise a service independent building block for accessing a signaling connection control part of the global title translation request.

16. The system, as set forth in claim 14, wherein the service independent building blocks comprise a service independent building block for updating a signaling connection control part of the global title translation request.

17. The system, as set forth in claim 14, wherein the service independent building blocks comprise a service independent building block for accessing a transaction capabilities application part of the global title translation request.

18. The system, as set forth in claim 14, wherein the service independent building blocks comprise a service independent building block for receiving the global title translation request.

19. The system, as set forth in claim 14, wherein the service independent building blocks comprise a service independent building block for returning a response to the global title translation request.

20. The system, as set forth in claim 14, wherein the service independent building blocks comprise a service independent building blocks for receiving a signaling connection control part unitdata message.

21. The system, as set forth in claim 14, wherein the service independent building blocks comprise a service independent building block for extracting a service key from a transaction capabilities application part message.

22. The system, as set forth in claim 12, wherein the graphical editor comprises user-manipulatable icon representations of the service independent building blocks.

23. A method for coding global title translation services, comprising the steps of:

defining a plurality of service independent building blocks each performing a discrete function associated with global title translation;

selecting and linking service independent building blocks to form a logic program performing a global title translation service;

accessing a signaling system no. 7 message of a global title translation request by the service independent building blocks;

selecting from an object library object classes corresponding to service independent building blocks in the logic program;

instantiating objects of the selected object classes; and creating an executable logic program having instances of object classes.

24. The method, as set forth in claim 23, further comprising the step of forming an ASCII logic program of the linked service independent building blocks.

25. The method, as set forth in claim 24, further comprising the step of parsing the ASCII logic program for identifying the service independent building blocks.

26. The method, as set forth in claim 23, further comprising the step of parsing the logic program for identifying the service independent building blocks.

27. The method, as set forth in claim 23, further comprising the steps of:

receiving a request for global title translation; and selecting an appropriate executable logic program for handling the request.

28. The method, as set forth in claim 23, further comprising the step of using a graphical editor for selecting and linking icon representations of the service independent building blocks.

29. The method, as set forth in claim 23, wherein the defining step further comprises the step of defining a service independent building block for accessing a signaling connection control part of a global title translation request.

30. The method, as set forth in claim 23, wherein the defining step further comprises the step of defining a service independent building block for updating a signaling connection control part of a global title translation request.

31. The method, as set forth in claim 23, wherein the defining step further comprises the step of defining a service independent building block for accessing a transaction capabilities application part of a global title translation request.

32. The method, as set forth in claim 23, wherein the defining step further comprises the step of defining a service independent building block for receiving a global title translation request.

33. The method, as set forth in claim 23, wherein the defining step further comprises the step of defining a service independent building block for returning a response to a global title translation request.

34. The method, as set forth in claim 23, wherein the defining step further comprises the step of receiving a signaling connection control part unitdata message.

35. The method, as set forth in claim 23, wherein the defining step further comprises the step of extracting a service key from a transaction capabilities application part message.

36. A method for coding global title translation services, comprising the steps of:

defining a plurality of discrete function blocks each performing a discrete function associated with global title translation;

selecting and linking discrete function blocks to form a logic program performing a global title translation service;

accessing a signaling system no. 7 message of a global title translation request by the discrete function blocks;

selecting from an object library object classes corresponding to discrete function blocks in the logic program;

instantiating objects of the selected object classes; and creating an executable logic program having instances of object classes.

37. The method, as set forth in claim 36, further comprising the step of forming an ASCII logic program of the linked discrete function blocks.

38. The method, as set forth in claim 37, further comprising the step of parsing the ASCII logic program for identifying the discrete function blocks.

39. The method, as set forth in claim 36, further comprising the step of parsing the logic program for identifying the discrete function blocks.

40. The method, as set forth in claim 36, further comprising the steps of:

receiving a request for global title translation; and selecting an appropriate executable logic program for handling the request.

41. The method, as set forth in claim 36, further comprising the step of using a graphical editor for selecting and linking icon representations of the discrete function blocks.

42. The method, as set forth in claim 36, wherein the defining step further comprises the step of defining a discrete function block for accessing a signaling connection control part of a global title translation request.

43. The method, as set forth in claim 36, wherein the defining step further comprises the step of defining a discrete function block for updating a signaling connection control part of a global title translation request.

44. The method, as set forth in claim 36, wherein the defining step further comprises the step of defining a discrete function block for accessing a transaction capabilities application part of a global title translation request.

45. The method, as set forth in claim 36, wherein the defining step further comprises the step of defining a discrete function block for receiving a global title translation request.

46. The method, as set forth in claim 36, wherein the defining step further comprises the step of defining a discrete function block for returning a response to a global title translation request.

47. The method, as set forth in claim 36, wherein the defining step further comprises the step of receiving a signaling connection control part unitdata message.

48. The method, as set forth in claim 36, wherein the defining step further comprises the step of extracting a service key from a transaction capabilities application part message.

* * * * *